Figure 1:
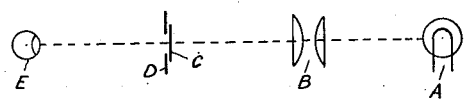

Feb. 22, 1938. T. G. FINZEL ET AL 2,108,804
MOISTUREPROOF MATERIAL AND PROCESS OF MAKING SAME
Filed March 29, 1934

Theron G. Finzel and
Donald E. Drew
INVENTORS

William J. Pritchard
BY
ATTORNEY

Patented Feb. 22, 1938

2,108,804

UNITED STATES PATENT OFFICE 2,108,804

MOISTUREPROOF MATERIAL AND PROCESS OF MAKING SAME

Theron G. Finzel and Donald E. Drew, Kenmore, N. Y., assignors, by mesne assignments, to E. I. du Pont de Nemours & Company, Wilmington, Del., a corporation of Delaware Application March 29, 1934, Serial No. 717,938

11 Claims. (Cl. 91—70)

This invention relates to the manufacture of highly transparent and moistureproof paper which is admirably suited for use as a wrapping for printed packages, cakes, etc., whereby the package or cakes may be clearly displayed and yet protected against atmospheric moisture changes. More particularly, this invention relates to a transparent and moistureproof paper suitable for use as a wrapping tissue and to the process of making the same.

Paper is generally made of cellulose fibers which are inherently transparent. However, due to the irregularities of the surface of the paper, caused by the irregularities in the surfaces of the fibers and the small diameter thereof, as well as the matted arrangement in the paper web, reflections and dispersions of light are produced with the result that the paper as a whole is opaque. In the usual manufacturing procedures, the paper web also contains air included between the fibers. Since air has a different refractive index from that of the fiber, it, too, increases the opacity of the paper web.

Glassine paper is produced from stock which is beaten to secure highly hydrated and brushed out fibers partly disintegrated so as to produce a considerable amount of mucilaginous cellulosic materials which serve to cement the brushed fibers together in a sheet, thereby forming a much denser and more homogeneous sheet than a tissue paper sheet. The homogeneity and transparency of the glassine paper is still further enhanced by increasing the moisture to a suitable content and super-calendering, during which operation the sheet is subjected to severe pressure. Though glassine paper is smooth to the touch and is more nearly optically homogeneous than highly calendered tissue paper, nevertheless, it is far from being optically smooth. Moreover, since glassine paper contains many fiber-air interspaces, optical homogeneity is not secured. The term "perfect optical homogeneity" is used to describe a condition of a sheet which will allow a ray of light to pass through it without distortion, the result being that an object viewed through such a sheet will appear in its natural outline and shape and will not be distorted, due to an irregular reflection and/or refraction of light waves. A sheet of high grade plate glass or optical glass is an example of such an optically homogeneous sheet as here understood. Transparent regenerated cellulose pellicles approach this optical homogeneity.

If a paper, such as tissue or glassine, is coated with the usual type of lacquers containing cellulose derivatives and having the same index of refraction as the cellulose fibers, there may be produced a paper which is more transparent than the original paper. However, in the usual procedures, it is exceedingly difficult, if not impossible, to secure complete penetration of the lacquer into the air spaces between and in the fibers. This difficulty is due to the fact that, upon evaporation of the solvent, the lacquer solids are not deposited in all the voids and/or do not fill them completely, whereby a non-continuous film with intervening air spaces is secured. There is also a tendency for the lacquer to shrink in volume as the solvent thereof evaporates, causing it to draw away from the fiber, thus producing minute voids which cause the lacquer-coated sheets to appear spotty and/or hazy and/or milky.

The coating of a sheet of tissue paper with an ordinary cellulose derivative lacquer, such as pyroxylin lacquer commonly used for wood and metal finishing, will not produce a sufficiently smooth and glossy surface on the paper, unless several coats of lacquer are applied which, in turn, increase the thickness of the paper to a point where the manufacture of a highly transparent paper will be uneconomical. When a sheet of tissue paper is coated with an ordinary pyroxylin lacquer, it appears glossy and transparent before any of the solvents of the lacquer are evaporated. In this state the sheet has a perfectly smooth and glossy liquid surface. However, after the solvents begin to evaporate and a skin of lacquer solids forms over the surface fibers of the paper, the pyroxylin lacquer coat conforms more or less to the rough contour of the sheet. Consequently, the resulting sheet, in addition to being spotty and/or hazy and/or milky as above explained, will also have a rough and mat-appearing surface. If a second coat of the same lacquer is applied and dried, the hills and valleys of the surface will become less pronounced and a surface on the sheet is secured which is smoother and more glossy, but the product is marked by the spotty and/or hazy and/or milky characteristics, due to internal optical discontinuity. Such a multi-coated sheet is obviously uneconomical to produce. It is to be understood that, when the surface of a sheet of paper is described as "rough" and has a mat surface, reference to optical roughness is meant. A surface may be smooth to touch but decidedly irregular to light passing through and/or reflected from the sheet.

In order to produce a sheet having the characteristics aforementioned as well as the maximum transparency, it is essential that the following conditions be met:

(1) The fibrous substance of the paper must be inherently transparent;

(2) The air spaces between the fibers and within the fibers should be filled completely with some material, the index of refraction of which is substantially that of the fibrous substances;

(3) The surface of the finished sheet should be smooth and without surface irregularities.

We have found that we can fulfill these conditions and produce a highly transparent and moistureproof paper which is also capable of being heat sealed to itself or other materials by impregnating a highly calendered paper, such as tissue paper, with a lacquer composition, the solids of which will soften below 115° C. to such a degree that they show residual hot flow or spreading, after a large portion of the solvents (90% or more) has been evaporated and while the sheet is being heated. Due to the character of the solids of the lacquer during the process of making the product of the invention, such solids will fill in the voids and flow into the valleys on the surface of the sheet, whereby a smooth, glossy and transparent sheet is secured.

It is, therefore, an object of this invention to provide a moistureproof and highly transparent paper having a surface approaching optical smoothness.

Another object of this invention is to provide a moistureproof and highly transparent paper having a surface approaching optical smoothness, and further characterized by the fact that it can be heat-sealed to itself or other materials, such as paper, card-board, etc. upon subjection to slight pressure at a suitable temperature, for example 100° C. to 150° C. more or less.

A further object of this invention is to provide a method of making the aforementioned material.

Figure 2:
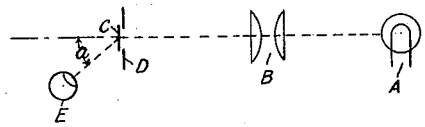
Figure 3:
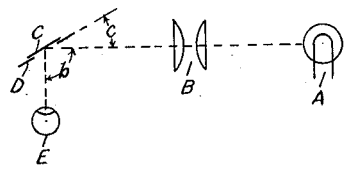

Other objects will appear from the following description, appended claims, accompanying drawing wherein:

Figures 1, 2 and 3 illustrate set-ups for determining transparency.

In accordance with the principles of the instant invention, a paper base, preferably a thin porous tissue paper not exceeding 0.002 inch in thickness, is highly calendered, i. e., super-calendered, and then impregnated with a composition of the type more fully explained hereafter. The impregnation is preferably accomplished by immersing the paper, such as by passing it through a bath of the lacquer heated to a temperature of 40° C.–100° C. The paper is caused to travel through the bath at such a speed that it will be completely impregnated. In other words, the paper is maintained in the bath for a sufficient time to permit and insure complete impregnation. After impregnation, the impregnated sheet is preferably, after removing the excess lacquer, subjected as quickly as possible to a drying temperature, whereby the solvents are evaporated. As will hereafter appear from a more detailed description of the lacquer, the lacquer solids, deposited upon the evaporation of a major portion of the solvents, such as at least 90% thereof, exhibit the characteristic of hot flow. As a consequence, during the evaporation of the solvents the deposited solids fill in the voids and flow and distribute themselves automatically to produce a highly transparent sheet, the voids of which are filled and the surface of which approaches optical smoothness. After the evaporation of the solvents, the so-treated material is preferably quickly chilled and, if desired, may be subjected to a humidifying treatment.

Alternatively, the paper base may be incompletely impregnated in the bath of lacquer. In this procedure, complete impregnation is secured during the early stages of the drying operation, i. e., while the impregnating lacquer is still in a decided fluid state.

In the preferred embodiment of the invention, prior to super-calendering, the tissue paper is treated with a solution of a wetting agent and dried to an appropriate moisture content. This treatment serves to increase the speed and thoroughness of impregnation and to inhibit the drawing away of the impregnant in the voids and also materially aids in obtaining maximum transparency.

The paper may be treated with a solution of a wetting agent, prior to calendering, during its manufacture, that is, on the paper machine or on the paper drier; or the dried paper may be passed through the selected wetting solution and subsequently dried. As previously mentioned, the wetted paper is not completely dried but permitted to retain an amount of moisture, preferably between 6% and 30% based on the bone dry paper, suitable for calendering. Alternatively, the paper, treated with a solution of a wetting agent, may be dried to normal air-dry condition and moistened with water at any time previous to super-calendering.

As illustrative wetting agents may be mentioned ammonium oleate, ammonium stearate, oleic acid, ammonium hydroxy stearate, stearic acid, triethanolamine oleate, sodium stearate, sodium oleate, naphthalene sulphonic acid, sulphonic acid derivatives of fatty acids or sulphonated vegetable or mineral oils. The selected wetting agent is dissolved in an appropriate solvent, such as water, alcohol or an alcohol-water mixture or any other solvent or solvent mixtures, depending on the solubility of the substance with which the paper is to be treated. The following compositions illustrate two preferred wetting solutions:

(1) 1.9% ammonium oleate dissolved in water, or (2) 1.9% ammonium oleate
20.7% water
77.4% denatured ethyl alcohol.

It is, of course, to be understood that the invention is not restricted to the use of the concentrations hereinbefore set forth. Beneficial effects have been secured by using concentrations of a wetting agent from 0.1% to 2.0%, or indeed to the solubility limit of the wetting agent in the solvent in question.

If desired, a paper softener, such as glycerin, ethylene glycol, di- or tri-ethylene glycol, may be added to the wetting solution to impart greater flexibility to the final product.

After the paper has been treated with the solution of wetting agent and dried to the proper moisture content, it is highly calendered, i. e., super-calendered, in order to make the surface as smooth as possible. It is preferable to use a calendering stack wherein half of the rolls are cold and the other half hot. This is equivalent to a cold calendering followed by a hot calendering. It is to be understood that, if the preferred type of paper, i. e., thin tissue paper, is used the calendered paper will not be transparent. It will be, at most, translucent. If a glassine or grease-proof type of paper is used, it will be semi-transparent at this point but not necessarily more transparent than an ordinary glassine paper, that is, one which has been moistened only with water prior to calendering.

The super-calendered paper is then impregnated with and highly transparentized by the lacquer composition immediately hereafter described. The lacquer comprises a resin, a cellulose derivative and a wax, with or without a plasticizer for the resin and/or the cellulose derivative, with or without a softener for the cellulose, that is, a softener for the paper fibers, dissolved in a suitable solvent or mixture of solvents.

The resin may be either natural or synthetic. We have prepared satisfactory lacquers through the use of rosin; hydrogenated rosin or its esters; rosin esters of glycerin, glycol or di-ethylene glycol; gum thus; or the alkyd resins, either modified or unmodified. We may, however, use any resin which is compatible with the cellulose derivative in question and which, when combined with the cellulose derivative, plasticizer and wax and when a large portion of the solvent has been removed, produces a composition which softens below 115° C.

As the cellulose derivative, we have found that ethyl cellulose is most satisfactory. Lacquers containing ethyl cellulose are especially satisfactory, due to the fact that the solids of such lacquers show a pronounced heat-sealing property. The solids of ethyl cellulose-containing lacquers show the property of hot flow to a remarkable degree, that is, these solids, when heated to incipient fusion, will flow to the low spots of a rough surface and into small crevices to produce a homogeneous and smooth sheet. Other cellulose ethers or esters, such as cellulose nitrate, cellulose acetate, may also be used but these do not impart such a high degree of hot flow as ethyl cellulose. We prefer to use cellulose derivatives of low viscosity. For best results the viscosity of the cellulose derivative should be below that shown by 20 second nitro cotton. More preferably, it should approximate that of 4 second or ½ second nitro cotton or it may be even lower.

For the plasticizer, we prefer to use one or more of the compounds which have a softening action on the cellulose derivatives and preferably also on the resin. We prefer to use a plasticizer which is practically odorless. We have obtained excellent results through the use of ethyl meta toluene sulphonamide, dibutyl phthalate, tricresyl phosphate, or triphenyl phosphate. We are, however, not limited to these and may use any plasticizer generally used in the manufacture of cellulose derivative lacquers. In many cases, it is not necessary to use a plasticizer at all. In such cases, a relatively soft resin may be chosen which acts in the capacity of both a resin and plasticizer. An example of such a soft resin is the rosin ester of diethylene glycol.

The wax serves as the basis for the moisture-proofing. As the specific wax, we prefer to use a colorless, high-melting paraffin wax, such as one having a melting point of over 50° C., such at 62° C., 55° C., 60° C. or higher. However, other waxes may be used, such as candelilla, seresin, synthetic wax or a mixture of several waxes.

It is not absolutely necessary to incorporate a softener for the paper fibers in the lacquer, inasmuch as the paper may have been previously treated with such a softener, or the uses to which the finished transparent paper is to be put do not require a highly softened paper. A case may arise, however, where the transparentized paper may lose some of its flexibility, due to the low air humidity with which the transparentized paper comes in contact. In such a case, it is desirable to incorporate a paper softener either into the paper before lacquering or by direct addition to the lacquer, or both. In addition to the effect of retaining the flexibility of the paper, we have found that those cellulose softeners which are compatible with the lacquer aid in reducing the milky haze and increasing the transparency of the final product. For this purpose, we may use ethylene glycol, di-ethylene glycol, tri-ethylene glycol or any other cellulose softener which is compatible with the lacquer.

As lacquer solvents for the above-mentioned lacquer solids, we may use any of the common lacquer solvents or mixtures thereof, or with the addition of suitable diluents, such as toluene or naphtha, in the case of pyroxylin lacquers. The solvent mixture is so adjusted to promote compatibility of the lacquer ingredients, to give desirable low viscosity characteristics to the lacquer and to give a suitable evaporation rate in keeping with the qualities desired of the finished product. We have found that the use of a considerable portion of high boiling solvents is desirable, so that the impregnation of the paper with a lacquer may be carried out at temperatures above 40° C. and up to the boiling point of the lowest boiling solvent. For instance, when using an ethyl cellulose lacquer dissolved in a mixture of denatured alcohol and low flash naphtha, it is desirable to impregnate the paper with this lacquer held at 75° C. We have used lacquers containing naphtha alone at temperatures up to 110° C. with success. Through a use of such a high lacquer bath temperature, we have found that the air entrapped within and between the fibers and also the moisture held by the fibers are greatly eliminated, resulting in a better penetration of the lacquer. It is necessary to hold the lacquer bath temperature above the crystallizing point of the wax in the lacquer.

The paper is preferably saturated with the lacquer in any suitable manner, such as by complete immersion in the lacquer bath. The excess lacquer may or may not be scraped from the sheet, depending upon the draw-off speed, viscosity of the lacquer, etc. If the draw-off speed is low, the excess lacquer will have time to drain before entering the drying chamber. On the other hand, if the paper is passed rapidly through the bath, doctor knives or other suitable means must be used to remove the excess lacquer. It is to be understood that we are not limited to this method of lacquer application. Any other method which insures thorough penetration may be used.

The drying operation is carried out preferably with warm air but it is desirable not to have the air temperature above 120° C. The best results are obtained when the drying temperature is above the melting point of the wax and at such a temperature at which substantially all of the solvents are eliminated from the sheet. Under the optimum conditions of drying, the solvents are evaporated, so that no incompatibility of the lacquer ingredients exists at any time during the drying operation. The temperature should preferably be such that, even though a large portion of the solvents has been removed, the lacquer solids will show a residual hot flow which will fill in the voids and also the valleys on the surface of the sheet, whereby a sheet characterized by an excellent and high transparency and a glossy surface approaching optical smoothness is secured.

Immediately after the sheet emerges from the hot drier, it is preferable to chill it rapidly by means of a cold air blast, chilled rolls or other suitable means. The object of this treatment is to set the softened lacquer solids on the paper base. If the sheet travels in the air for a considerable length of time after it emerges from the drier and before it is carried over a roll or other means of support, it will not be necessary to apply this chilling treatment.

After the drying operation, it is desirable to subject the coated sheet to a humidified atmosphere for a sufficient time, and at a temperature preferably above 40° C., to incorporate an amount of moisture within the sheet slightly above or equivalent to that of an air-dry condition.

After humidification, it is sometimes preferable to heat the coated sheet quickly to a high temperature, preferably below 125° C., for one or two seconds and then quickly chill by means of a cold air blast or other suitable means. The object of this is to eliminate any haze induced by the humidifying treatment and to improve the gloss, by momentarily softening the coat and then chilling rapidly to prevent loss of the moisture incorporated in the sheet during humidification.

The ingredients constituting the lacquer are used in such proportions as to give, in addition to transparency and moistureproofness, a flexible, non-brittle, non-tacky and non-smeary or non-greasy product. The ingredients which constitute the lacquer will in general fall within the following limits, depending upon the specific paper used and the specific quality desired in the product:

*Limits—Percent by weight*

Resin _____ 80– 5.0
Cellulose derivative _____ 60–10.0
Wax _____ 13– 0.5
Plasticizer _____ 30– 0.0
Cellulose softener _____ 35– 0.0
Solvents to give 8–40% total solids.

By the term "total solids" is meant the sum of resin, the cellulose derivative, the wax, the plasticizer and the cellulose softener. Even though the plasticizer and cellulose softener are usually liquid, these are substantially non-volatile and remain as a portion of the product and therefore are considered as solids in the product.

The resin and/or plasticizer in the lacquer solids will not only become softened, when warmed to 50° C.–125° C. but will exert a partial solubilizing action on the cellulose derivatives. In general, the resin plus plasticizer content will exceed the cellulose derivative content. The resin alone may exceed the cellulose derivative content. It may be as much as twice the cellulose derivative content in certain cases. By increasing the ratio of the resin to the cellulose derivative, the finished impregnated and coated product becomes more brittle, but more transparent and less hazy. It is evident, of course, that the brittleness of the prduct will increase, not only due to a higher percentage of the resin, but also due to the use of a harder or more brittle resin. Where a very soft resin is used, no brittleness will be developed, regardless of the percentage of resin used. In fact, certain soft resins act as a plasticizer for the cellulose derivative to such an extent that no addition of plasticizer is necessary. When dealing with such a soft resin, it is a matter of definition whether it should be called a plasticizer for the cellulose derivative or be called a resin. Di-ethylene glycol phthalate and the rosin ester of di-ethylene glycol are soft resins of this type.

On the other hand, the greater the percentage of the cellulose derivative, the tougher will be the product, but also the less transparent and the more hazy. For the best results, with a porous type of paper, it is desirable to use a cellulose derivative of low voscosity. For instance, 4 second or half second nitro cotton, or ethyl cellulose of an equivalent or lower viscosity, is preferable. Of the various cellulose derivatives, ethyl cellulose is preferred because lacquer solids containing it have a lower softening temperature, show a greater tendency toward hot flow and also heat seal more readily.

The proportion of plasticizer used will depend upon the hardness of the resin and the ratio of resin to cellulose derivative and also upon the specific nature of the plasticizer in question. An increase in the ratio of plasticizer to the combined weight of resin and cellulose derivative will increase the flexibility and toughness and in general will also decrease the haze and increase the gloss of the product. It will also lower the softening temperature and increase the hot flow property of the lacquer solids. An excess of the plasticizer will, however, produce a tacky condition. In such cases where a soft resin is used, either no plasticizer need be added at all or a very small percentage of plasticizer will suffice.

By increasing the percentage of wax, there is a gradual tendency to increase the haziness of the product. If the product has a tendency to become tacky, an increase in the percentage of wax will usually aid in removing this tackiness. Furthermore, the greater the ratio of resin to cellulose derivative, the greater will be the wax tolerance. It is understood, of course, that some resins and cellulose derivatives will have a greater tolerance for wax than other resins or cellulose derivatives, so that the optimum percentage of wax will depend upon the specific resin or the specific cellulose derivative and may vary widely from resin to resin and from cellulose derivative to cellulose derivative.

A softener for the paper, that is, a cellulose softener, may or may not be incorporated in the lacquer. It is quite possible to treat the paper before lacquering with a paper softener and thus eliminate it from the lacquer. It is also possible to treat the paper with a cellulose softener before lacquering and, in addition, include some cellulose softener in the coating lacquer. On the other hand, it may be desired to produce a transparent paper with a decided "rattle" to it rather than a very soft and flexible product. In such a case, the cellulose softener may be omitted entirely from the product. The incorporation of a cellulose softener does, however, have an advantage above that of simply increasing the flexibility of the product. This advantage is a decrease in the haziness in the finished product. Increasing the ratio of cellulose softener to the remaining solids decreases the haze and increases the flexibility, but, if used in a large proportion, has the tendency to increase the tackiness of the final product.

The solvent or solvent mixture consists in a portion of a hydrocarbon or mixture of hydrocarbons, preferably aromatic hydrocarbons, such as benzol, toluol or naphthas of various boiling points, as a wax solvent. In addition, an active solvent for the resin and cellulose derivative is incorporated in the solvent mixture. This active solvent may consist of acetone, ethyl acetate, butyl acetate, ethyl lactate, monoethyl ether of ethylene glycol, monobutyl ether of ethylene glycol or any of the well known cellulose derivative solvents. It is preferable to use a relatively high proportion of the high boiling solvents. This allows impregnation and evaporation at higher temperatures which is desirable for the thorough impregnation of paper. In addition, the solvent mixture may contain some such ingredient which, in combination with the wax solvent and/or resin and cellulose derivative solvent, tends to reduce the viscosity of the lacquer more than mere dilution would indicate. Such an ingredient is ethyl alcohol which is especially effective in reducing the viscosity of ethyl cellulose lacquers. Other alcohols, such as butyl or amyl alcohols, may also be used. Certain cellulose derivatives, such as ethyl cellulose, are soluble in the aromatic hydrocarbons. This, of course, simplifies the solvent mixture considerably. In such a case, a mixture of an aromatic hydrocarbon and ethyl alcohol (usually from 2%–20% alcohol) will satisfy the solvent and viscosity requirements of the lacquer. It is evident that the proportion of the aromatic hydrocarbon used will be determined by the particular cellulose derivatives in question. For instance, ethyl cellulose will tolerate 100% aromatic hydrocarbon, that is, it will be dissolved by aromatic hydrocarbons, while in the case of the nitro cotton lacquer it is not advisable to use over 50% aromatic hydrocarbons in a solvent mixture.

The solids content of the lacquer may vary from 8%–40%, depending upon the viscosity of the lacquer in question. Some lacquers containing 10% solids will be more viscous than others containing 20% solids. The viscosity of the lacquers depends upon the ratio of the resins to cellulose derivatives, upon the type of cellulose derivatives, upon the type of resin, and also upon the choice of solvents. Usually, the higher the ratio of resins to cellulose derivatives, the lower will be the viscosity of the lacquer, all other factors remaining constant. The viscosity of the lacquer chosen will also depend upon the type of paper treated. For instance, if a high grade of glassine paper is coated, a lacquer of higher viscosity than that used for a porous paper can be used. Glassine paper is relatively non-porous, so that the transparentization of such a paper depends mainly upon the covering of the paper surface with a smooth layer of lacquer. For a porous paper, it is desired to use a lacquer of the highest possible solids content and the lowest viscosity for that solids content, so that penetration and impregnation into the paper will result.

The ratio of the lacquer to the weight of the paper depends upon the thickness and type of paper which has been used and the degree to which the paper has been calendered. In any case, it is necessary to have sufficient lacquer solids applied to the paper to cover all the surface fibers, in addition to filling all the interspaces between the fibers. Within reasonable limits, the greater the surplus of lacquer solids applied to the paper sheets, the greater will be the transparency of the finished product. However, the thickness of the coating used is dictated by the economics of the process. Satisfactory results have been secured when the base consisting of porous paper does not exceed 0.002 inch in thickness and is preferably 0.0005 inch to 0.0014 inch, and the total quantity of lacquer solids is at least 25% by weight of the product. When the base consists of a non-porous paper, such as glassine paper, having an average thickness of 0.0007 inch, it shows remarkably good light transmission and freedom from haze, when impregnated and coated to produce a final product, the average thickness of which is 0.0008 inch to 0.0012 inch. Such a product corresponds to one having at least 10% by weight of the lacquer solids based on the final product. For any type of paper, the thinner the base, the more transparent will be the final product.

For the purposes of this specification and claims, we define moistureproof materials as those which, in the form of continuous, unbroken sheets or films, permit the passage of not more than 690 grams of water vapor per 100 square meters per hour, over a period of 24 hours, at approximately 39.5° C.±0.5° C., the relative humidity of the atmosphere at one side of the film being maintained at least at 98% and the relative humidity of the atmosphere at the other side being maintained at such a value as to give a humidity differential of at least 95%.

Moistureproofing coating compositions are defined as those which, when laid down in the form of a thin, continuous, unbroken film applied uniformly as a coating with a total coating thickness not exceeding 0.0005" to both sides of a sheet of regenerated cellulose of thickness approximately 0.0009", will produce a coated product which is moistureproof.

For the purposes of experimental tests, especially for those materials adaptable as coating compositions, moistureproof materials include those substances, compounds or compositions which, when laid down in the form of a continuous, unbroken film applied uniformly as a coating with a total coating thickness not exceeding 0.0005" to both sides of a sheet of regenerated cellulose of thickness approximately 0.0009", will produce a coated sheet which will permit the passage therethrough of not more than 690 grams of water vapor per 100 square meters per hour over a period of approximately 24 hours, at a temperature of 39.5° C.±0.5° C. (preferably 39.5° C.±0.25° C.), with a water vapor pressure differential of 50–55 mm. (preferably 53.4±0.7 mm.) of mercury. For convenience, the number of grams of water vapor passed under these conditions may be referred to as "the permeability value". An uncoated sheet of regenerated cellulose having a thickness of approximately 0.0009" will show a permeability value of the order of 6900.

In many cases, the moistureproofness is 20, 30, 40, 50 and up to 100 or more times better than the untreated paper. The product is relatively impermeable to air and other gases. It is odorless, glossy and possesses a surface which approaches optical smoothness. It has an advantage over moistureproofed regenerated cellulose in cost and, additionally, in more favorable expansion and shrinkage characteristics. The extent of expansion and shrinkage with changes in humidity is practically negligible compared with either coated regenerated cellulose sheeting or coated glassine paper. As compared with waxed papers, besides being more transparent and less hazy, it shows a higher area coverage per pound of product and is less smeary. It is flexible but not sticky and has a dry-feeling surface, so that several sheets will slip very readily over each other. This easy slip facilitates handling of the product in automatic wrapping machines.

The product of this invention is truly heat-sealable. When the product herein described is heat-sealed, there will be produced a joint or seal which is stronger than that produced by the heat-sealing of ordinary wax papers of the prior art.

The following test has been devised to determine and test the strength of the joints beforementioned.

Strips of the coated material 1.5 inches wide are superposed on one end, so that the opposite faces of the film are in contact. A seal is made across the width of the material by imposing thereon a heated iron weighing 1,500 grams for 2 seconds. The iron is so designed as to cause a seal to be made of a width of $\frac{3}{32}$ of an inch, the iron being maintained in any suitable manner at a temperature above 130° C. and below 200° C. as, for instance, 150° C. Two strips so sealed are opened at the free end and placed in a stretching device, such as a Suter testing machine, by gripping each end of the sheet in suitable clamps, one of which is fixed and the other of which is moved away at a constant speed of 12″ per minute. The force in grams required to pull the sheets apart is taken as a measure of the strength of the bond and is referred to herein as "heat-sealing value".

For some purposes, a sheet with more "rattle", i. e., a stiffer sheet, is required for other purposes which require a limp and extremely soft sheet. By a sheet with a "rattle" we mean such a sheet which, when shaken, emits a rattling sound. This is a matter of adding more or less cellulose softener or lacquer plasticizer to the lacquer solids. A sheet with such a "rattle" will usually show a visible white mark, when creased sharply. This is unavoidable unless a softer sheet is produced.

White haze is best observed when sheets of the various papers are compared in contact with a black background. Ordinary glassine papers or wax-coated papers of the glassine type heretofore produced, if laid flat on top of a black background, will tend to destroy much of this blackness, so that, when the background is viewed through the paper, it has a greyish cast. When the black background is viewed through transparent regenerated cellulose sheeting, none of the blackness is destroyed and, when the black background is viewed through the product herein described, it appears considerably clearer than it does when viewed through glassine papers or other papers heretofore produced.

Internal reflection serves to reduce contrast of printing or illustrations on packages wrapped with such a paper. This effect is best illustrated by means of an example. Take, for instance, a package printed in designs of red and green, such as the Lucky Strike cigarette package. Such a package wrapped with ordinary glassine paper will appear dull and milky and without gloss, and has lost nearly all of the brilliancy of colors. This is due to the fact that a certain amount of incident light never reaches the package but is reflected diffusely as white light from the interior and surface of the glassine paper. This reflected white light dilutes the red and green reflected from the package to such an extent that the depth of the color as finally perceived by the eye will be far below the original values. A similar package wrapped in a sheet of transparent regenerated cellulose appears in its full and undiluted colors, due to the lack of diffuse internal and diffuse surface reflections of such a transparent sheet.

The product produced by the herein described process shows an effect on a wrapped package practically undistinguishable from that shown by transparent regenerated cellulose sheeting. In transparency, when laid close to printed matter and in freedom from white milky haze, this product is far superior to any of the so-called transparent papers or waxed papers heretofore produced.

To illustrate the merits of papers treated according to the herein-disclosed process, compared with transparent regenerated cellulose sheeting and a variety of papers, the following values of light transmission, diffusely transmitted light and diffusely reflected light with their methods of determination are included:

| Material | Thickness in inches | Percent transmission | Diffusely transmitted light | Diffusely reflected light |
|---|---|---|---|---|
| Transparent regenerated cellulose sheeting—300 gauge | 0.0009 | 86.8 | 1.0 | 1.0 |
| 10 pound tissue treated according to our process | 0.0012 | 76.8 | 3.4 | 1.80 |
| Glassine treated with lacquer disclosed in Ex. 1 | 0.0011 | 66.2 | 8.5 | 3.10 |
| *Best lacquered glassines on the market* | | | | |
| A | 0.0011 | 59.3 | 12.8 | 6.10 |
| B | 0.0012 | 62.4 | 10.0 | 3.95 |
| C | 0.00085 | 64.9 | 10.1 | 3.27 |
| D | 0.0009 | 66.8 | 8.7 | 3.48 |
| *Best waxed glassines on the market* | | | | |
| E | 0.0011 | 59.9 | 7.8 | 4.34 |
| F | 0.0014 | 45.3 | 12.3 | 8.82 |
| *Waxed paper* | | | | |
| Waxed paper for wrapping bread | 0.0016 | 20.4 | 51.2 | above 19.0 |
| *Untreated papers* | | | | |
| Un-waxed paper for wrapping bread | 0.0015 | 1.5 | 107.0 | above 19.0 |
| Plain glassine | 0.0009 | 52.8 | 13.7 | 8.52 |
| 10 pound tissue uncoated | 0.0007 | 19.0 | 41.8 | above 19.0 |

The percentage of light transmission of the various samples listed in the table above was determined in a manner as shown in Figure 1. A is a source of light, B a set of condenser lenses, C the sample in question, D the sample holder having a circular opening 1″ in diameter, E a photoelectric cell placed at a distance of 3⅞ inches from the sample. Air was considered to have 100% light transmission, that is, the photoelectric cell was set to read 100% without the sample inserted in the path of the light. Using this setting, each sample was placed at point C and the transmission values were read directly. These values are set forth in Column 3 of the table.

Diffusely transmitted light was determined as shown in Figure 2. The reference characters designate the same element as in Figure 1, each sample being inserted at position C. The distance between C and E is 3⅞ inches, the angle $a$ is 40°, and the opening in D is 1 inch in diameter. The instrument was set to give transparent regenerated cellulose sheeting an arbitrary value of 1.0. Without changing this setting, the other samples were inserted in order at position C. The other samples bear values which are relative to transparent regenerated cellulose sheeting as 1.0. Obviously, the greater the amount of diffusely transmitted light, the greater will be the values in Column 4 of the table.

Diffusely reflected light was measured as indicated in Figure 3. Here again, the reference characters designate the same elements as in the preceding figures. The distance between C and E is 3⅞ inches, the angle $b$ is 90°, the angle $c$ is 30°, and the opening in D is 1½" x 1 1/16". The instrument was set to give transparent regenerated cellulose sheeting an arbitrary value of 1.0. Using this instrument setting, the other samples were inserted at position C. The magnitude of diffusely reflected light of each sample is related to transparent regenerated cellulose sheeting which has an arbitrary value of 1.0. These values are given in Column 5 of the table.

It is evident that the higher the values of diffusely transmitted or diffusely reflected light are, the more hazy will the sheet appear.

Column 2 of the above table gives the thickness of each sample measured.

In order to more fully explain the invention, the following specific illustrative examples are set forth. It is to be understood that these examples merely describe several embodiments and that the invention is not restricted thereto.

*Example IA.*—A thin porous sulphite tissue between 0.0005 inch and 0.001 inch in thickness is treated with a solution consisting of the following ingredients in approximately the proportions given:

|  | Parts |
|---|---|
| Ammonium oleate by weight | 1.9 |
| Water by weight | 20.7 |
| Denatured alcohol by weight | 77.4 |
| Di-ethylene glycol by weight | 5.0 |

The excess soap solution is removed by means of squeeze rolls and the wet tissue is passed over drier rolls, drying until the tissue feels distinctly moist (10%–15% moisture). The damp tissue is passed through a super-calender stack, the rolls of which are cool. This is followed by a second super-calendering operation in which heated rolls are used. It is possible to combine these calendering operations using a stack in which one-half of the rolls are cooled and the other half heated. As the tissue emerges from the hot calender rolls, it is dry and has a fine polish. The calendered tissue is impregnated with a lacquer bath consisting of the following composition, by weight:

| Solids: | Percent |
|---|---|
| Rosin | 48.8 |
| Low viscosity ethyl cellulose | 24.4 |
| Ethyl meta toluene sulphonamide | 6.1 |
| Paraffin (M. P. 60° C. to 62° C.) | 7.3 |
| Di-ethylene glycol | 13.4 |
|  | 100.0 |
| Solvent: |  |
| Low flash naphtha | 90.0 |
| Denatured alcohol | 10.0 |
|  | 100.0 |
| Solids content | 23–30 |

The temperature of the lacquer bath is held between 65° C. and 75° C. and the time for immersion of the sheet is at least 10 seconds. The excess lacquer is allowed to drain from the sheet or be scraped off by suitable doctor knives or other means. The lacquer-impregnated sheet is passed into a drying chamber, the temperature of which is held between 85° C. and 95° C. The lacquered sheet is allowed to remain in the hot drying chamber until the temperature of the sheet approaches that of the air within the drying chamber, which temperature is above the melting point of the wax, and at which temperature the lacquer solids (which will still hold a small amount of solvent) will be soft and flow to any irregular areas on the sheet. This hot flow will produce a smooth, glossy surface. The sheet is allowed to remain in the drier until substantially all of the solvents have been removed. The hot sheet is allowed to pass from the heated drying chamber into a cool compartment, or is subjected to a cold air blast to rapidly chill and set the lacquer solids.

To replace the moisture in the paper which was lost during intensive drying, the coated product is subjected to a humidified atmosphere holding the temperature above 45° C. and the relative humidity between 60% and 85%. If the paper is subjected to the higher humidity, a slight blush may develop. To remove this blush, the humidified sheet is quickly heated to a high temperature (75° C.–90° C.) for 1 or 2 seconds, then quickly cooled by means of an air blast or cold roll. After chilling, the sheet is wound on a suitable core.

The film produced in the above-described manner contains 25%–30% lacquer solids and is resistant to the passage of moisture to the extent of 75 to 100 times that of the untreated paper. It shows a very high light transmission and is substantially free from white milky haze. Further, it will readily seal to itself or to paper or cardboard, if mildly pressed to itself, paper or cardboard and when locally heated to 75° C.–100° C. but not over 150° C.

*Example IB.*—The lacquer composition consisting of the following ingredients in approximately the proportions given is substituted for that disclosed in Example IA. The same paper, treating procedure, drying, humidification, etc. are used:—

| Solids: | Percent by weight |
|---|---|
| Ester gum | 42.5 |
| Low viscosity ethyl cellulose | 34.0 |
| Paraffin (M. P. 60° C. to 62° C.) | 4.3 |
| Dibutyl phthalate | 6.4 |
| Di-ethylene glycol | 12.8 |
|  | 100.0 |
| Solvent: |  |
| High flash naphtha | 79.2 |
| Denatured alcohol | 20.8 |
|  | 100.0 |
| Solids content | 18–22 |

This composition produces a product containing 40% lacquer solids and is similar to that described in Example IA. The heat-sealing property is less pronounced but the product is slightly softer than that described in Example IA.

*Example II.*—A thin porous paper is treated while still moist and in the paper machine drier with one of the following solutions:—

1. 1%–2% by weight ammonium oleate in water
2. 1%–2% by weight ammonium stearate in water
3. 1%–2% by weight sulphonated castor oil in water
4. 1%–2% by weight triethanolamine in water This solution is applied to the paper while in the drier. It is desirable not to dry completely, but to carry out the drying operation until the paper is still distinctly moist, and to wind up moist. The moist paper is passed through a super-calender stack, at least a portion of the rolls of which are heated. Should production conditions make it impractical to calender directly after the paper has been made, it is possible to dry the soap-treated paper to a normal air-dry condition and wind up preparatory for storage or shipment. Previous to calendering, the paper may be moistened by water or steam to the desired degree. The calendered paper is treated with the following lacquer composition. The percentages are expressed in weight:—

Solids: Percent
Rosin ester of di-ethylene glycol____ 51.4
Low viscosity ethyl cellulose_____ 41.1
Paraffin (M. P. 60° C. to 62° C.)_____ 7.5
——
100.0

Solvent:
High flash naphtha_____ 79.2
Denatured alcohol _____ 20.8
——
100.0

Solids content_____ 18–22

The temperature of the lacquer bath is held above 60° C. and the lacquer treated paper is dried in a drying chamber held above 85° C. but below 110° C. After drying, the sheet is cooled and humidified. Humidification is carried out above 45° C. and at a relative humidity above 60%. The final product contains 35% of lacquer solids.

This example differs from Example I mainly in the manner of incorporating the wetting agent into the tissue. For large scale production, application in the paper drier is preferable. For treatment of an already manufactured tissue, the use of an alcoholic solution as described in Example I is better adapted than any aqueous solution here disclosed. The reason for this is that an aqueous solution will weaken the tissue to a point where it is difficult to handle without breaking, unless special equipment, as felts, etc., as used in paper driers, is employed.

*Example III.*—A thin moist paper is passed through a super-calender stack, a portion or all of the rolls of which are heated. The dry calendered paper is treated with a lacquer composition consisting of the following ingredients in approximately the proportions given and held between 60° C. and 75° C.:—

Solids: Percent by weight
Alkyd resin_____ 51.3
One-half second nitro cotton_____ 25.6
Tricresyl phosphate_____ 10.3
Triphenyl phosphate_____ 10.3
Paraffin _____ 2.5
——
100.0

Solvent:
Butyl lactate _____ 69.8
Ethyl alcohol _____ 2.2
High flash naphtha_____ 14.0
Monobutyl ether of ethylene glycol___ 14.0
——
100.0

Solids content_____ 20–24

The alkyd resin is composed of glyceryl phthalate 60%, stearin 40%.

The lacquer is kept in contact with the paper for at least 15 seconds to insure proper penetration. The drying temperature of the lacquer is 75° C.–95° C. The sheet is passed through a humidifying atmosphere, the temperature of which is above 45° C. and the relative humidity is between 60% and 85%.

The product contains 45% lacquer solids and is transparent, highly moistureproof and glossy. It is free from white milky haze and objectionable spots.

This example differs from Example I mainly in that no wetting agent has been incorporated in the paper before lacquering, with the result that longer lacquer impregnation is necessary. Also, for this type (pyroxylin) lacquer, no additional chilling, other than that which room temperature would offer, is necessary when the sheet emerges from the drier. Quick heating followed by quick chilling after the film has been humidified is not necessary.

A dyed or colored product may be produced by either dyeing or coloring the paper stock before it is made into a sheet, or after it has been made into a sheet, or by applying a colored lacquer to the base. The product may be tinted to neutralize certain objectionable colors of the resins used in the lacquer. Such tinting may be carried out by applying a small amount of dye or finely divided colloidal material directly to the base in a separate operation, or during the manufacture of the base, or such tinting material may be added to the lacquer. Small amounts of dark dye, or finely-divided colloidal pigment, or pigment-like material, when added, will tend to be adsorbed by white particles of cellulose or fiber fragments in the paper sheet, so that the resulting diffuse reflection of white light will be less than that originally present in the sheet. Among such colloidal materials, even finely-divided carbon black may be used, if its use is limited to small amounts.

It is understood that the herein-described process can be applied to cloth or any other material in which the irregularity of surface and/or the fibrous or non-homogeneous nature of the material decreases its transparency.

If any of the herein-described lacquers are applied to heavy papers or papers containing fillers or other materials tending to decrease the light transmission through such papers, the resulting coated product will possess all the properties above recited with the exception of transparency.

Since it is obvious that various modifications may be made in the above description without departing from the nature or spirit thereof, this invention is not restricted thereto except as set forth in the appended claims.

We claim:

1. A method which comprises highly calendering paper, impregnating said paper with a moistureproofing and transparentizing lacquer, the solids of said lacquer possessing the hot-flow property, evaporating the solvents from the treated paper at a temperature sufficient to cause the solids to automatically hot flow and fill the voids when the composition contains a minor portion of solvents.

2. A method which comprises highly calendering paper, impregnating said paper with a moistureproofing and transparentizing lacquer at a temperature of 40° C. to 100° C., the solids of said lacquer comprising a cellulose derivative, a resin and a wax in proportions to simultaneously moistureproof and transparentize the paper and possessing the hot-flow property, evaporating the solvents from the treated paper at a temperature sufficient to cause the solids to automatically hot flow and fill the voids when the composition contains a minor portion of solvents.

3. A method which comprises treating paper with a solution of a wetting agent, reducing the moisture content of said paper, highly calendering said paper, impregnating said paper with a moistureproofing and transparentizing lacquer, the solids of said lacquer possessing the hot-flow property, evaporating the solvents from the treated paper at a temperature sufficient to cause the solids to automatically hot flow and fill the voids when the composition contains a minor portion of solvents.

4. A method which comprises treating paper with a solution of a wetting agent, reducing the moisture content of said paper until said moisture content is from 6% to 30% by weight of the bone dry paper, highly calendering said paper, impregnating said paper with a moistureproofing and transparentizing lacquer, the solids of said lacquer possessing the hot-flow property, evaporating the solvents from the treated paper at a temperature sufficient to cause the solids to automatically hot flow and fill the voids when the composition contains a minor portion of solvents, and causing the solids to set.

5. A method which comprises treating paper with a solution of a wetting agent, reducing the moisture content of said paper until said moisture content is from 6% to 30% by weight of the bone dry paper, highly calendering said paper, impregnating said paper with a moistureproofing and transparentizing lacquer at a temperature of 40° C. to 100° C., the solids of said lacquer comprising a cellulose derivative, a resin and a wax in proportions to simultaneously moistureproof and transparentize the paper and possessing the hot-flow property, evaporating the solvents from the treated paper at a temperature sufficient to cause the solids to automatically hot flow and fill the voids when the composition contains a minor portion of solvents, and causing the solids to set.

6. A method which comprises incorporating a wetting agent in paper, highly calendering said paper, immersing said paper in a moistureproofing and transparentizing lacquer at a temperature of from 40° C. to 100° C., the solids of said lacquer comprising a cellulose derivative, a resin and a wax in proportions to simultaneously moistureproof and transparentize the paper and possessing the hot-flow characteristic, evaporating the solvents from the impregnated paper at a temperature sufficient to cause the solids to automatically hot flow and fill the voids when the composition contains a minor portion of solvents.

7. A material suitable for use as a wrapping tissue comprising a highly calendered paper having a wetting agent incorporated therein and impregnated to fill the voids thereof and thinly coated with a composition comprising a cellulose derivative, a resin and a wax in proportions to simultaneously transparentize and moistureproof said paper, the product having surfaces approaching optical smoothness.

8. A material suitable for use as a wrapping tissue comprising a highly calendered paper having a wetting agent incorporated therein and impregnated to fill the voids thereof and thinly coated with a composition which simultaneously transparentizes and moistureproofs said paper, the product having surfaces approaching optical smoothness.

9. A material suitable for use as a wrapping tissue comprising a highly calendered thin porous sulphite tissue between 0.0005 inch to 0.001 inch in thickness having a wetting agent incorporated therein and impregnated to fill the voids thereof with a composition which simultaneously transparentizes and moistureproofs said paper, said composition comprising:

| | Percent |
|---|---|
| Rosin | 48.8 |
| Low viscosity ethyl cellulose | 24.4 |
| Ethyl meta toluene sulphonamide | 6.1 |
| Paraffin (M. P. 60° C. to 62° C.) | 7.3 |
| Di-ethylene glycol | 13.4 | the proportions being by weight, the product having surfaces approaching optical smoothness.

10. A material suitable for use as a wrapping tissue comprising a highly calendered thin porous sulphite tissue having a wetting agent incorporated therein and impregnated to fill the voids thereof with a composition which simultaneously transparentizes and moistureproofs said paper, said composition comprising:

| | Percent |
|---|---|
| Rosin ester of di-ethylene glycol | 51.4 |
| Low viscosity ethyl cellulose | 41.1 |
| Paraffin (M. P. 60° C. to 62° C.) | 7.5 | the proportions being by weight, the product having surfaces approaching optical smoothness.

11. A material suitable for use as a wrapping tissue comprising a highly calendered thin porous sulphite tissue having a wetting agent incorporated therein and impregnated to fill the voids thereof with a composition which simultaneously transparentizes and moistureproofs said paper, said composition comprising:

| | Percent |
|---|---|
| Ester gum | 42.5 |
| Low viscosity ethyl cellulose | 34.0 |
| Paraffin (M. P. 60° C. to 62° C.) | 4.3 |
| Dibutyl phthalate | 6.4 |
| Di-ethylene glycol | 12.8 | the proportions being by weight, the product having surfaces approaching optical smoothness.

THERON G. FINZEL.
DONALD E. DREW.

CERTIFICATE OF CORRECTION.

Patent No. 2,108,804. February 22, 1938.

THERON G. FINZEL, ET AL.

It is hereby certified that error appears in the printed specification of the above numbered patent requiring correction as follows: Page 3, first column, line 62, for "at 62°C." read as 52°C.; line 63, for "seresin" read ceresin; page 4, first column, line 46, for "substantialy" read substantially; and that the said Letters Patent should be read with these corrections therein that the same may conform to the record of the case in the Patent Office.

Signed and sealed this 12th day of April, A. D. 1938.

(Seal)

Henry Van Arsdale,
Acting Commissioner of Patents.